(12) United States Patent
Osborne

(10) Patent No.: US 6,786,312 B1
(45) Date of Patent: Sep. 7, 2004

(54) MOTORCYCLE COMBINATION CLUTCH AND BRAKE SYSTEM

(76) Inventor: Lewis L. Osborne, 3812 N. Slavik, Odessa, TX (US) 79764

( * ) Notice: Subject to any disclaimer, the term of this patent is extended or adjusted under 35 U.S.C. 154(b) by 0 days.

(21) Appl. No.: 10/320,970

(22) Filed: Dec. 16, 2002

(51) Int. Cl.[7] ............................ F16D 67/02; B62D 61/02
(52) U.S. Cl. ........................ 192/13 R; 74/478; 180/219; 192/99 S
(58) Field of Search ............................ 192/13 R, 12 R, 192/13 A, 99 S; 74/478, 471 R, 107; 180/219, 218

(56) References Cited

U.S. PATENT DOCUMENTS

| | | | |
|---|---|---|---|
| 1,885,442 A | * | 11/1932 | Holland ........................ 74/478 |
| 1,973,826 A | | 9/1934 | Schweering |
| 2,085,550 A | | 6/1937 | Staude |
| 2,214,778 A | | 9/1940 | Strange |
| 3,815,697 A | * | 6/1974 | Bridwell et al. .......... 192/13 R |
| 5,101,945 A | | 4/1992 | Scott |
| 6,227,341 B1 | * | 5/2001 | Dalbiez et al. .......... 192/70.25 |

* cited by examiner

Primary Examiner—Rodney H. Bonick
(74) Attorney, Agent, or Firm—Milburn & Peterson, P.C.; Robert C. Peterson

(57) ABSTRACT

A combination clutch and brake system that may be original equipment for or retrofitted to a motorcycle having a clutch, brake and stick shift mechanical rear box. The sole operating lever for applying the clutch and brake includes an adjustable cam and linkage arrangement whereby either the clutch or brake may be activated first or both activated substantially concurrently. The clutch is controlled by cam action and the brake by a adjustable linkage to the cam which legs the rotation of the cam.

10 Claims, 4 Drawing Sheets

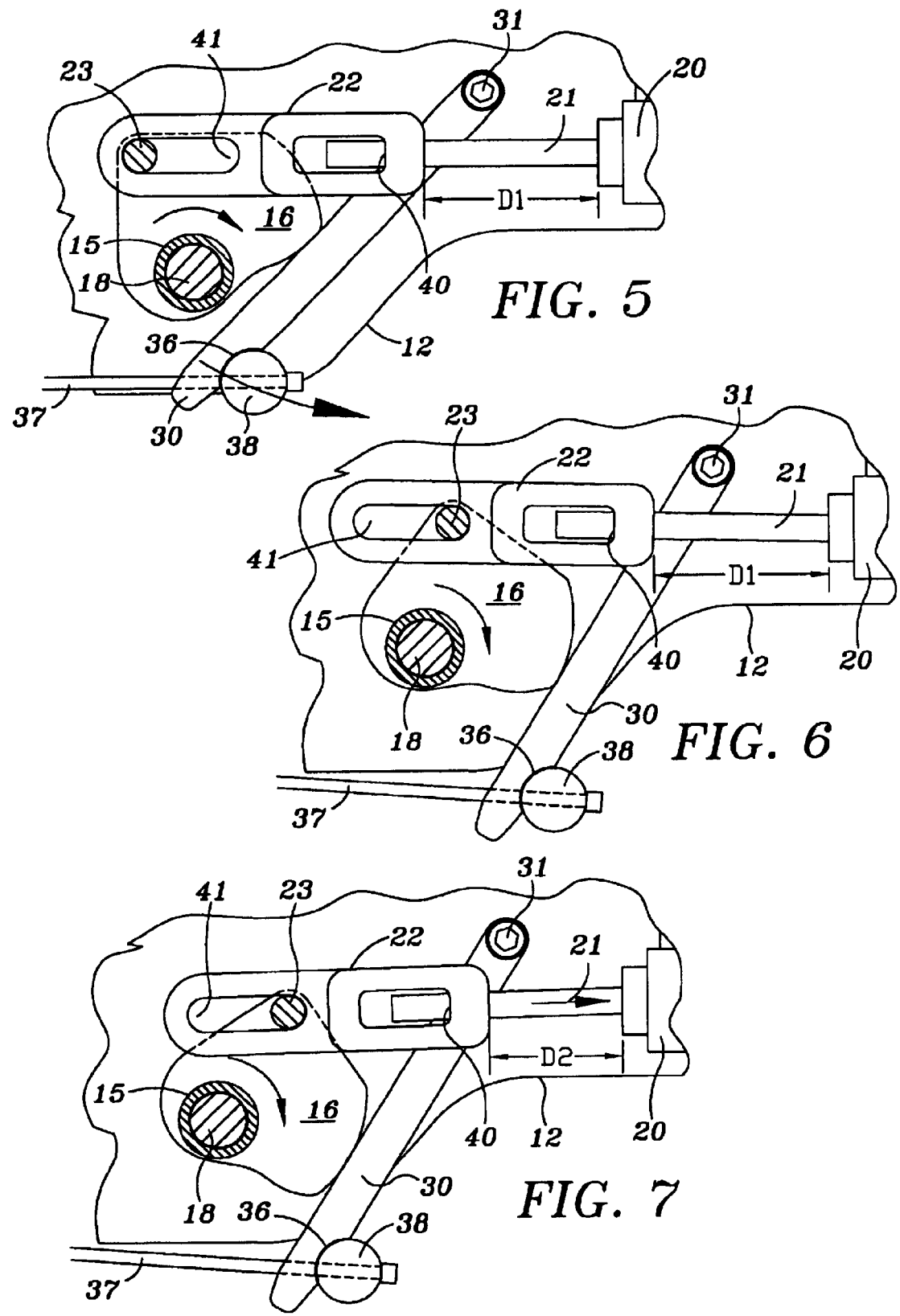

MOTORCYCLE COMBINATION CLUTCH AND BRAKE SYSTEM

BACKGROUND OF THE INVENTION

1. Technical Field

This invention relates in general to motorcycles and in particularly to motorcycles having both foot clutch and foot brake systems. More particularly, it relates to a mechanical clutch and hydraulic brake systems for motorcycles.

2. Description of Related Art

In existing motorcycle clutch systems, a hand clutch lever is located on the handle bars and includes cable means for mechanically coupling the movement of the clutch to disengage and engage the clutch mechanism to allow shifting of the gears on those motorcycles having a mechanical shifted gear system. Other motorcycles with mechanical gear shifts employ one foot pedal for the clutch, again through cable arrangements for engaging and disengaging the hand shifted gears, while the other pedal is normally a brake pedal. In this arrangement, the throttle is controlled by hand on one side of the handle bar.

In an arrangement where one foot is used to engage and disengage the clutch and the other foot is used to engage and disengage the brake, constitutes somewhat of a hazard when a motorcycle is in stop and go traffic. In such situations, the motorcyclist would have to engage the clutch and shift the gear into neutral and then apply the brake and place the free foot on the ground to support the motorcycle. Also, the motorcyclists alternatively would engage the brake to slow down the motorcycle, then engage the clutch to shift into neutral and then fully apply the brake. With the motorcycle fully stopped, the motorcyclist would have to repeat the process in reverse, engage the clutch and shift into gear with the brake off and then accelerate.

Other arrangements have been provided by motorcycle manufacturer including automatic transmissions. In such arrangement, the transmission is controlled by a hand lever and the other hand operates the accelerator, such that only one foot is required for the brake with the other foot free to place on the ground. Still many motorcycle enthusiasts desire mechanical hand shifted transmissions where the usual arrangement is a foot pedal for the brake and a foot pedal for the clutch.

Moreover, many motorcycle manufacturers provide a hydraulic clutch system. Discussion of such a hydraulic clutch system is set out in U.S. Pat. No. 6,227,342 B1.

SUMMARY OF THE INVENTION

This invention sets forth a retrofit arrangement to provide a clutch/brake system, which allows a hand shift motorcycle rider the ability to routinely place a foot on the ground when coming to a complete stop and until take-off. This is accomplished by a single clutch/brake pedal, which may be located for the use of either the left foot or the right foot of the rider. Furthermore in three-wheel motorcycles, the combining of the clutch and brake operation by a single pedal would permit a handicap person having use of only one leg for various reasons to operate the three-wheel motorcycle in a completely safe manner.

The invention is accomplished by the movement of a foot lever through a cam arrangement to disengage the clutch and with further movement apply the brake while the clutch remains disengaged. This permits the motorcyclist to place one foot on the ground where it remains until the brake is released and the clutch engaged for taking off and accelerating the motorcycle.

Further, by adjusting the lag in the application of the brake after the clutch the brake may be partially applied before the clutch is disengaged. Such an arrangement would improve braking efficiency, the same as an automobile driver would apply the brakes before disengaging the clutch in a conventional stick shift mechanical gear box. In this arrangement the cam-brake linkage would initially apply the brake and upon further movement of the clutch/brake, the cam action would completely disengage the clutch. In starting after a stop, the gears would be shifted while the brake was applied and the clutch disengaged, then the clutch would be engaged just as the brake was released.

BRIEF DESCRIPTION OF THE DRAWINGS

FIG. 5 illustrates the relation between clutch lever, brake plunger and the cam with the clutch engaged and the brake released.

FIG. 6 is similar to FIG. 5 wherein the clutch is disengaged and the brake has not been applied.

FIG. 7 is similar to FIG. 6 with the clutch fully disengaged and the brake fully applied.

DETAILED DESCRIPTION OF THE PREFERRED EMBODIMENT

Figure 1:
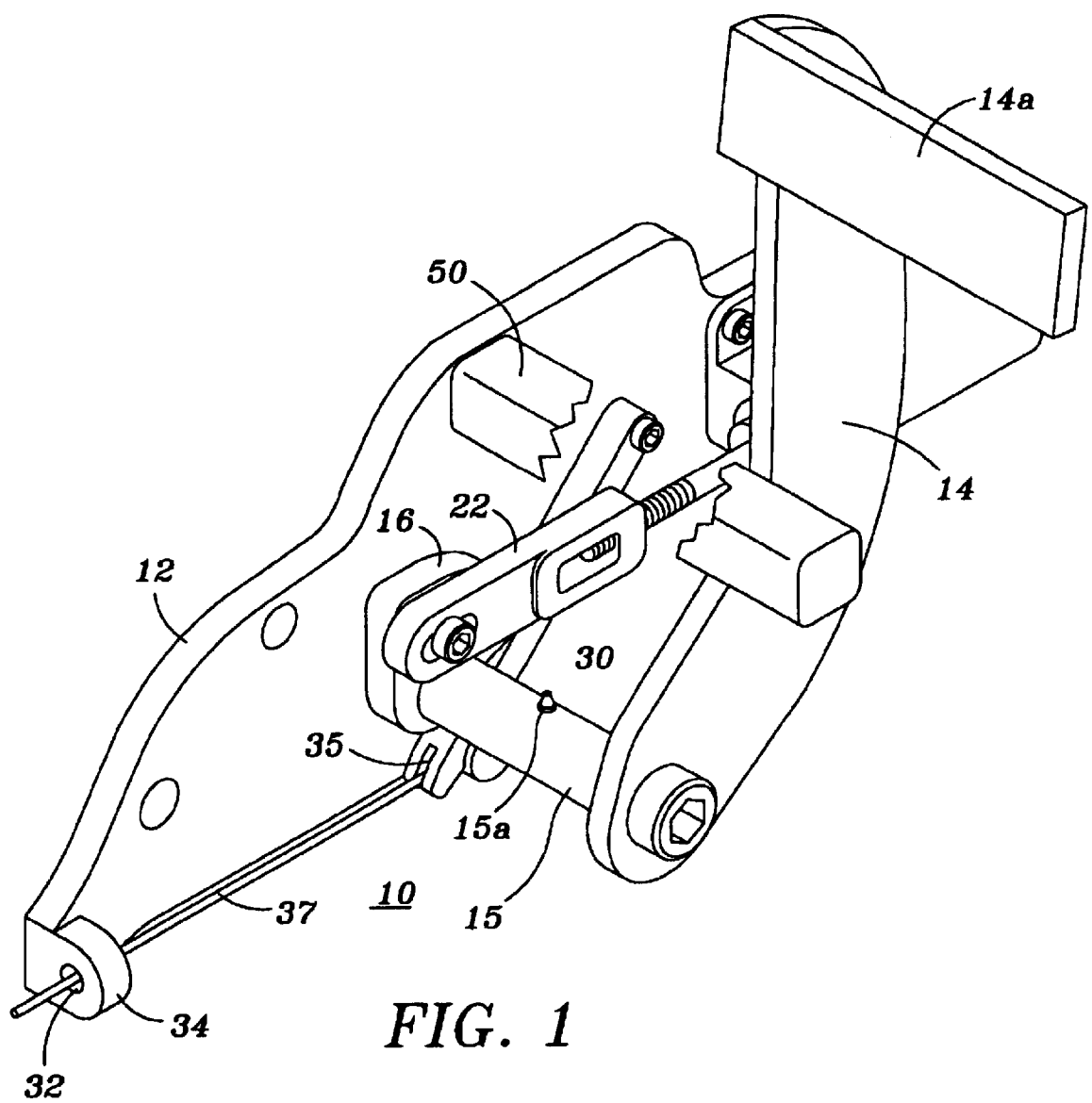
FIG. 1 is a perspective view of the clutch/brake assembly for retrofitting to an existing motorcycle.
Figure 2:
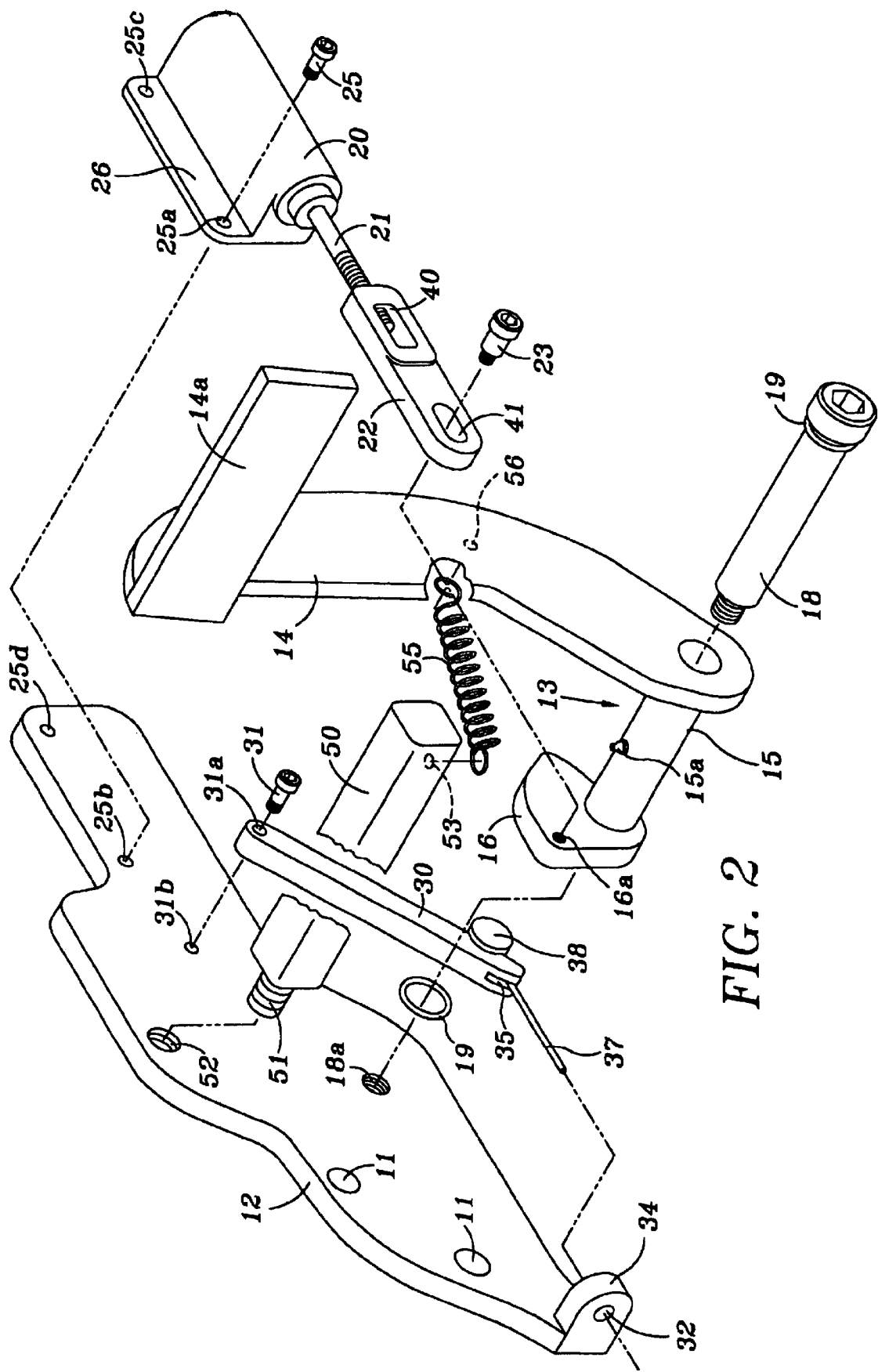
FIG. 2 is an exploded view of the clutch/brake assembly in FIG. 1.

Referring now to the Figures and particularly to FIGS. 1 and 2, there is illustrated a combination clutch and brake system 10. System 10 includes mounting bracket 12 secured to the frame of a motorcycle (not shown). Clutch and brake actuator 13 includes sleeve 15 with central grease fitting 15a. Rigidly attached at one end of sleeve 15 is clutch brake lever 14 with foot pedal 14a. The opposed end of sleeve 15 has cam 16 rigidly attached.

Shoulder bolt 18 seats inside sleeve 15 and threaded into tap 18a on mounting bracket 12 with O-rings 19 sealing sleeve 15 at each end. Clutch and brake actuator 13 is free to oscillate about shoulder bolt 18. Clutch rod 30 is secured by shoulder bolt 31 through aperture 31a and threaded into tap 31b in mounting bracket 12. Clutch rod 30 is free to rotate around shoulder bolt 31. At the other end of clutch rod 30 is slot 35 and recess 36 (best seen in FIGS. 5, 6 and 7). Cable 37 has cable lugs 38 attached at one end and seats in recess 36 and extends through slot 35 and through aperture 32 in cable guide 34 and extends to the clutch assembly of the motorcycle (not shown). Clutch rod 30 is positioned to engage cam 16 such that clockwise rotation (as viewed in FIG. 1) will cause clutch rod 30 to rotate counterclockwise to disengage the clutch in the clutch assembly (not shown).

Figure 3:
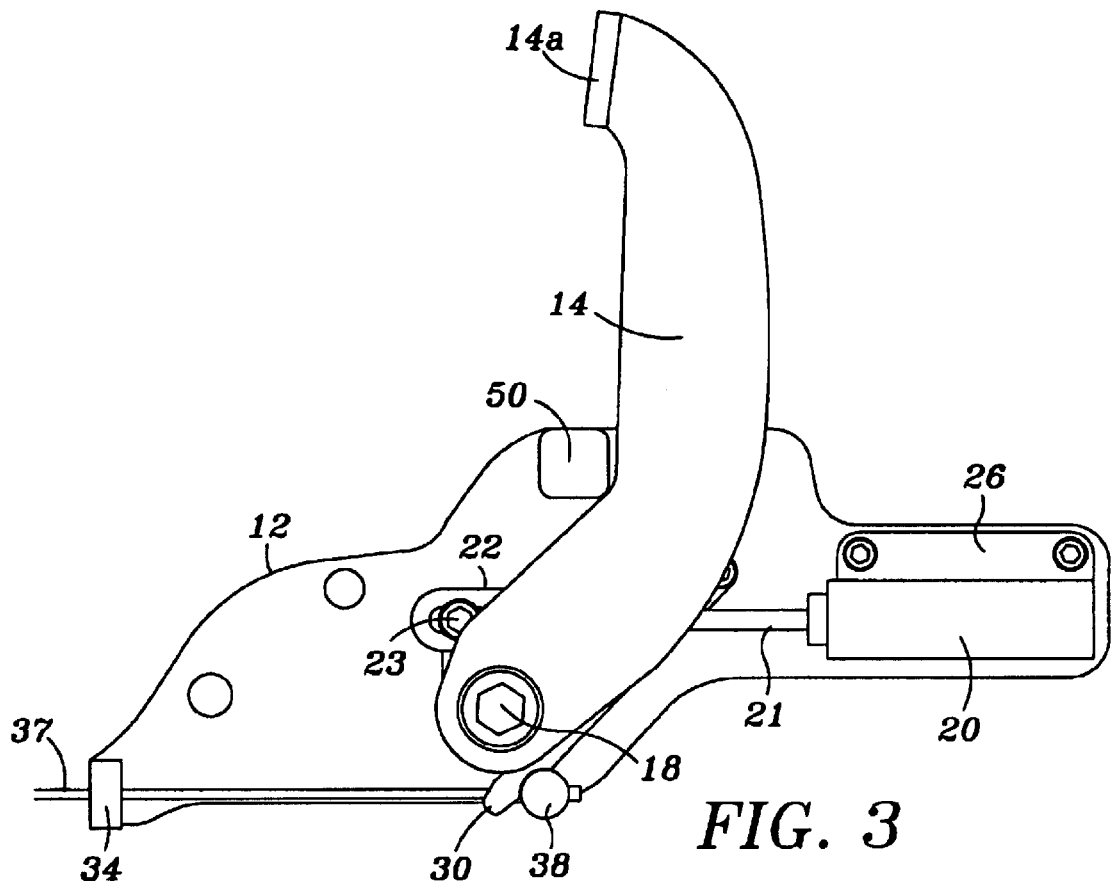
FIG. 3 is a side elevation of the clutch/brake assembly in which neither the clutch nor brake is engaged.
Figure 4:
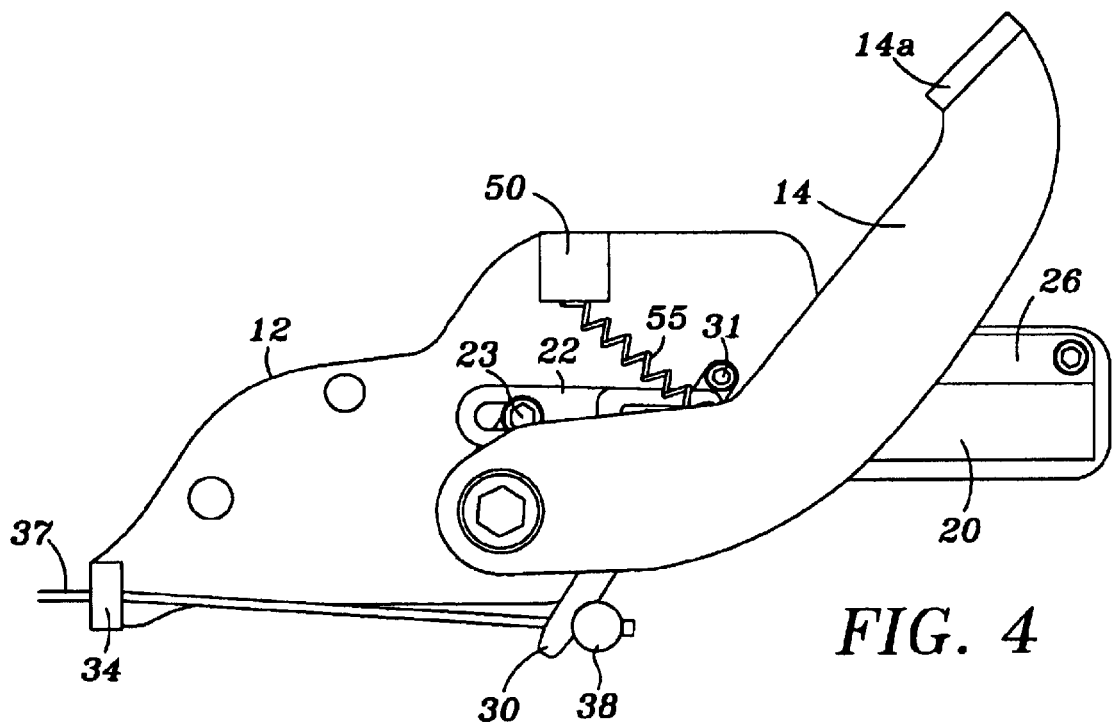
FIG. 4 is a side elevation view of the clutch/brake assembly wherein the clutch if fully disengaged and the brake fully engaged.

Brake cylinder 20 is mounted to mounting bracket 12 by bolt 25 through apertures 25a in brake cylinder 20 and into taps 25b in mounting bracket 12. A bolt, similar to bolt 25 would be mounted through tap 25c in brake bracket 26 and into tap 25d (not shown), but see FIGS. 3 and 4.

Operating rod 21 extends from brake cylinder 20, which activates an internal plunger in brake cylinder 20 to activate the hydraulic brake system of the motorcycle (not shown). Threaded onto operating rod 21 is sliding brake controller 22, which has threaded slot 40 and elongated slot 41. Sliding brake controller 22 is coupled to cam 16 by cam shoulder bolt 23, which extends through elongated slot 41 and threaded into tap 16*a*.

Foot peg 50 is secured in threaded aperture 52 of mounting bracket 12. Return spring 55 is secured at one end in tap 53 of foot peg 50 and the other end of return spring 55 is attached in tap 56 of clutch brake lever 14. Thus, return spring 55 holds clutch brake lever 14 seated against foot peg 50 when no pressure is being applied to foot pedal 14*a*.

Further referring to FIGS. 4, 5, 6 and 7, the operation of combined clutch and brake system 10 will be described. In the initial position of brake clutch lever 14, the clutch is fully engaged and shoulder bolt 23 attached to cam 16 is in the rear most position in slot 41 of sliding brake controller 22 and the distance span between brake cylinder 20 and sliding brake controller 22 by operating rod 21, is indicated as D1 in FIG. 5 and the brake is not applied. In this position, the motorcycle is moving down the roadway. When the rider is ready to shift gears or come to a stop, clutch brake lever 14 is rotated forwardly in the applying motion by depressing pedal 14*a*. With this action, shoulder bolt 23 on cam 16 rotates with cam 16 and moves from the rear of slot 41 to the front of slot 41. Further clockwise rotation of cam 16 by further depressing pedal 14*a* moves clutch rod 30 counterclockwise, thus pulling cable 37 forward thereby disengaging the clutch (not shown) attached to cable 37. Referring to FIG. 6, it will be observed that cam 16 has rotated clockwise and cam shoulder bolt 23 is now positioned at the forward most position in slot 41 of sliding brake controller 22. At this point, the clutch has been disengaged and the brake has not been applied and the rider is free to shift the gears to suit the road conditions being encountered. Upon continued rotation of cam 16 with clutch brake lever 14, cam shoulder bolt 23 of cam 16 pushes sliding brake controller 22 towards brake cylinder 20 with operating rod 21 moving within brake cylinder 20 to push the internal brake plunger and apply hydraulic pressure to the brake system causing the motorcycle to slow or stop and the clutch remains disengaged. With the brake fully applied, FIG. 7 illustrates the position of cam 16, sliding brake controller 22 and the distance span of operating rod 21 between sliding brake controller 22 and brake cylinder 20 is reduced from D1 to D2 with operating rod 21 engaging the internal plunger of brake cylinder 20 to apply the hydraulic brakes. Upon releasing pressure on foot pedal 14*a*, return spring 55 contracts and operating lever 14 rotates rearwardly in the return motion releasing the brake and engaging the clutch.

By adjusting the depth that operating rod 21 is threaded into threaded slot 40 would require further movement of operating rod 21 before moving the internal plunger of brake cylinder 20 to apply hydraulic pressure to the brakes. In this manner, the clutch would remain disengaged and clutch brake lever 14 would be further rotated before the brakes would be applied. Further, by unthreading operating rod 21 from threaded slot 40, the distance D1 in FIG. 5 would be increased and cam shoulder bolt 23 would be positioned intermediate the ends of elongated slot 41. Upon initial rotation of clutch brake lever 14, thereby rotating cam 16 clockwise, the travel of cam shoulder bolt 23 in elongated slot 41 would engage the forward most end of elongated slot 41 moving sliding brake controller 22 and operating rod 21 to engage the internal plunger of brake cylinder 20, initiating braking before clutch rod 30 has moved to disengage the clutch of the motorcycle. Thus maintaining the gears engaged to aid in slowing the motorcycle by allowing the gear to be engaged through part of the braking of the motorcycle.

Thus it will be recognized that the combination clutch and brake system 10, by relatively simple adjustments, can be made to disengage the clutch before the brake is applied and to disengage the clutch and engage the brake at the same time or engage the brake and then disengage the clutch.

The ability to make adjustments to the combination clutch and brake system permits safer operation of the motorcycle over city streets, on the highway, in mountain regions and through rugged terrain. Further, the combination clutch and hydraulic brake systems may be utilized for either the left or right foot of the rider.

What is claimed:

1. In a motorcycle having a frame, a clutch mechanism, a mechanical gear shift and a brake mechanism, the improvement comprising a unitary clutch and brake system including:
   (a) a control lever mounted on the frame restricted to bidirectional rotation relative thereto;
   (b) a cam mounted for rotation with the control lever;
   (c) a clutch rod linkage engaged by the cam for operation of the clutch; and
   (d) an adjustable lost motion linkage coupled to the cam and lagging rotation therewith for activating the brake system, the adjustable linkage presettable to effect one of the following functions upon depression of the control lever:
      (i) disengaging the clutch and then engaging the brake;
      (ii) disengaging the clutch and engaging the brake substantially concurrently; and
      (iii) engaging the brake and then disengaging the clutch.

2. The unitary clutch and brake system of claim 1, wherein the cam has a lateral projection and the lost motion linkage includes a bar having a slot at one end and an adjustable rod at the other end coupled to the cam with the lateral projection positioned in the slot and the adjustable rod for activating the brake system.

3. The unitary clutch and brake system of claim 1 wherein the control lever has a pedal for imparting foot movement to the lever for operation of the clutch and brake system.

4. A unitary clutch and brake system for a motorcycle having a frame, a mechanical gear box and clutch for shifting gears and a hydraulic brake system including a master brake cylinder comprising:
   (a) an operating lever, having an integral cam with a camming surface and a lateral projection, attached to the frame restricted to oscillatory movement relative thereto;
   (b) a follower device tracking the camming surface attached to the clutch for disengaging and engaging the clutch to allow shifting of the gears;
   (c) a linkage having a slot engaging the lateral projection allowing limited presettable movement of the projection relative to the slot and adjustably attached to the master brake cylinder for activating the brake system;
   (d) whereby moving the operating lever in an applying motion initiates one of the following sequences:
      (i) disengaging the clutch and then engaging the brake system,
      (ii) disengaging the clutch and engaging the braking system substantially concurrent, and
      (iii) engaging the braking system and then disengaging the clutch; and (e) whereby moving the operating lever in a releasing motion reverses the applying motion sequence.

5. The unitary clutch and brake system of claim 4, wherein the follower device is a bar pivotally attached at one end to the frame and the other end attached by a cable to the clutch.

6. The unitary clutch and brake system of claim 4, wherein a foot peg extends from the frame and a return spring is connected between the operating lever and the foot peg biasing the operating lever against the foot peg.

7. The unitary clutch and brake system of claim 6, wherein the operating lever has an integral foot pedal and depressing the foot pedal moves the operating lever against the biasing of the return spring initiating one of the said sequences.

8. A unitary clutch and brake assembly for attachment to the frame of a motorcycle for operating the clutch and brake comprising:

(a) a mounting bracket attached to the frame;

(b) an operating member having a foot pedal sector and a cam sector mounted to the bracket restricted to rotary movement, the cam sector includes a camming face and a lateral projection;

(c) a clutch rod mounted to the bracket at one end and seated against the camming face with the other end attached to the clutch for operation thereof;

(d) a presettable lost motion linkage coupled between the lateral projection and the brake for operation thereof;

(e) whereby depressing the foot pedal sector rotates the cam sector against the clutch rod and with the presettable lost motion linkage effect one of the following sequences:

(i) disengaging the clutch and then engaging the brake;

(ii) disengaging the clutch and engaging the brake substantially concurrently; and (iii) engaging the brake and then disengaging the clutch.

9. The unitary clutch and brake assembly of claim 8, wherein a foot peg extends from the mounting bracket and a return spring is connected between the foot pedal sector and the foot peg biasing the operating member against the foot peg.

10. The unitary clutch and brake assembly of claim 8, wherein the lost motion linkage includes a bar having a slot at one end coupled to the lateral projection and an adjustable rod at the other end coupled to the brake for operating the brake.

\* \* \* \* \*